United States Patent [19]
Tamura et al.

[11] Patent Number: 4,764,786
[45] Date of Patent: Aug. 16, 1988

[54] DISTANCE MEASURING DEVICE FOR CAMERA

[75] Inventors: Shuichi Tamura, Kanagawa; Yoshihiro Harunari, Tokyo, both of Japan

[73] Assignee: Canon Kabushiki Kaisha, Japan

[21] Appl. No.: 113,340

[22] Filed: Oct. 22, 1987

Related U.S. Application Data

[63] Continuation of Ser. No. 866,600, May 23, 1986, abandoned.

[30] Foreign Application Priority Data

| May 27, 1985 | [JP] | Japan | 60-113908 |
| Jul. 12, 1985 | [JP] | Japan | 60-152296 |
| Jul. 12, 1985 | [JP] | Japan | 60-152297 |
| Jul. 12, 1985 | [JP] | Japan | 60-152298 |

[51] Int. Cl.⁴ .............................................. G03B 3/00
[52] U.S. Cl. ................................................ 354/403
[58] Field of Search ............................ 354/400–408, 354/415; 356/1, 4

[56] References Cited

U.S. PATENT DOCUMENTS

| 4,257,705 | 3/1981 | Hosoe et al. | 356/1 |
| 4,483,602 | 11/1984 | Aoki et al. | 354/402 |
| 4,575,211 | 3/1986 | Matsumura et al. | 354/403 |

FOREIGN PATENT DOCUMENTS

| 0193408 | 11/1984 | Japan | 356/1 |
| 0144711 | 7/1985 | Japan | 354/400 |

*Primary Examiner*—W. B. Perkey
*Attorney, Agent, or Firm*—Toren, McGeady & Associates

[57] ABSTRACT

A distance measuring device for a camera includes a first distance measuring arrangement adapted for measuring the distance of the middle part of a photographing field; a second distance measuring arrangement for measuring the distances of the middle and peripheral parts of the field; and a switch for selection between the first and second distance measuring arrangements.

16 Claims, 11 Drawing Sheets

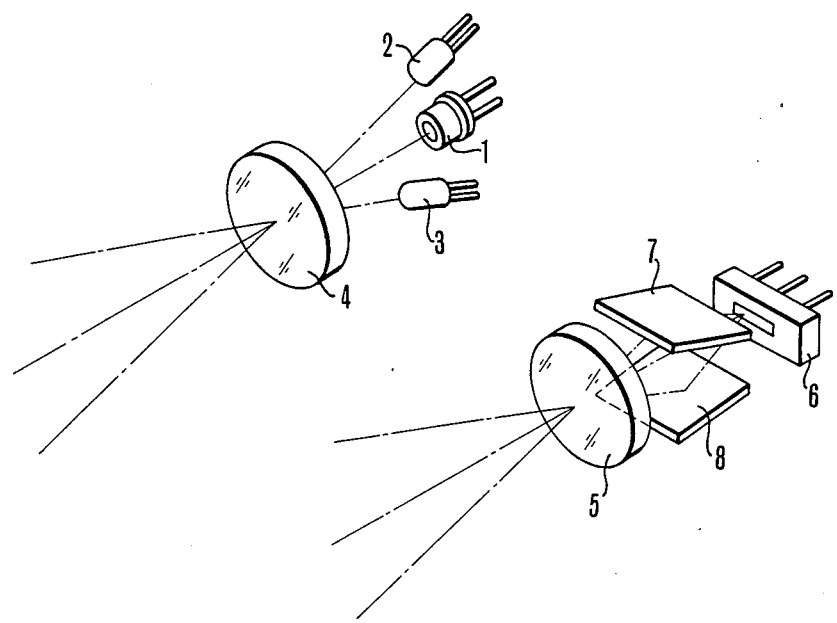
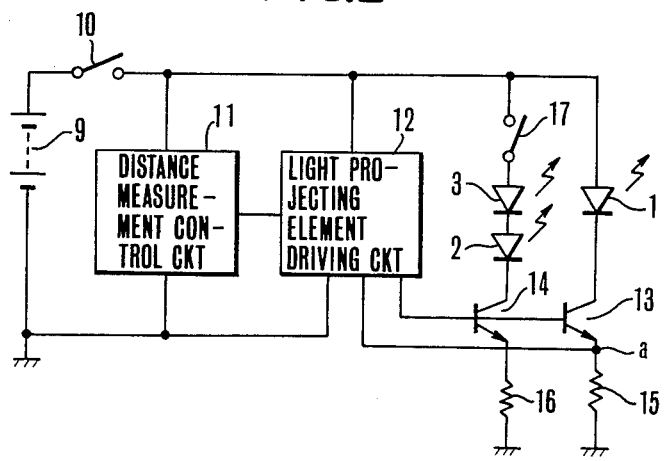

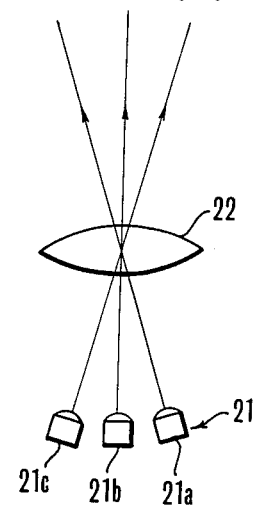
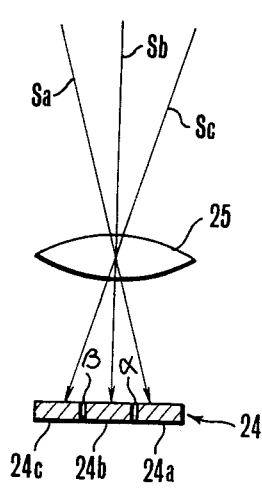
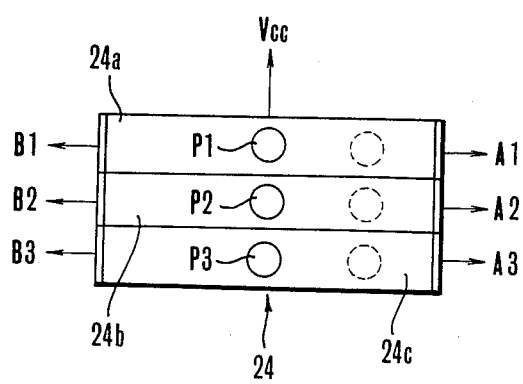

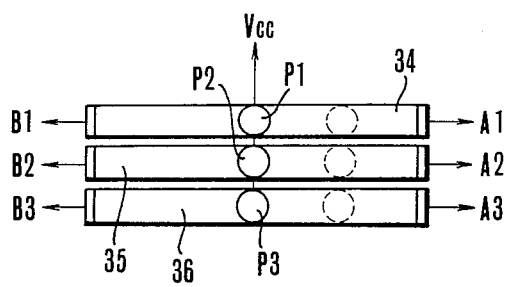
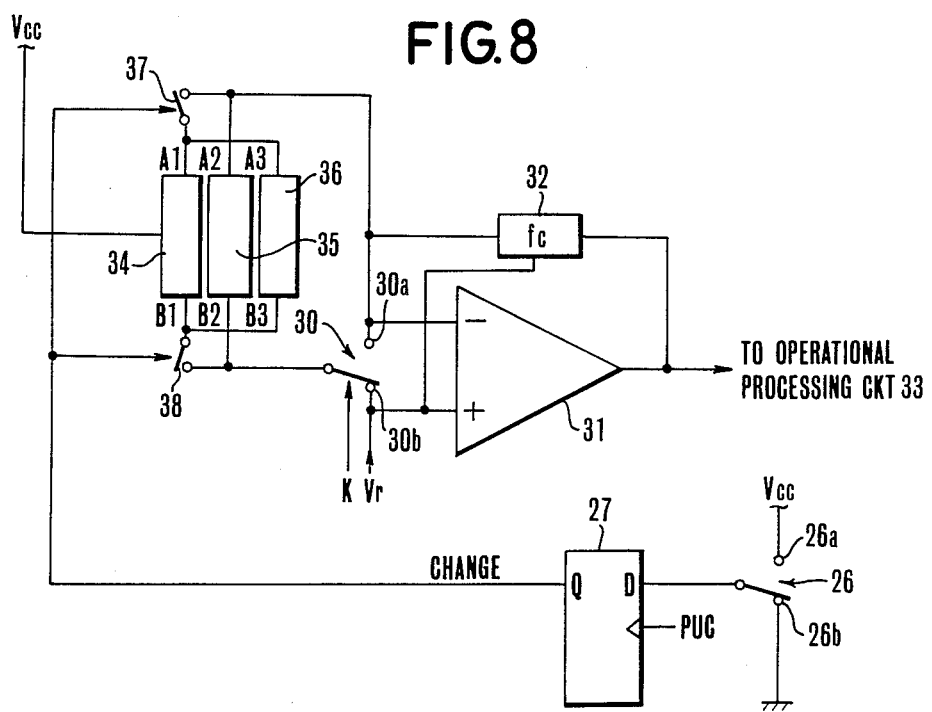

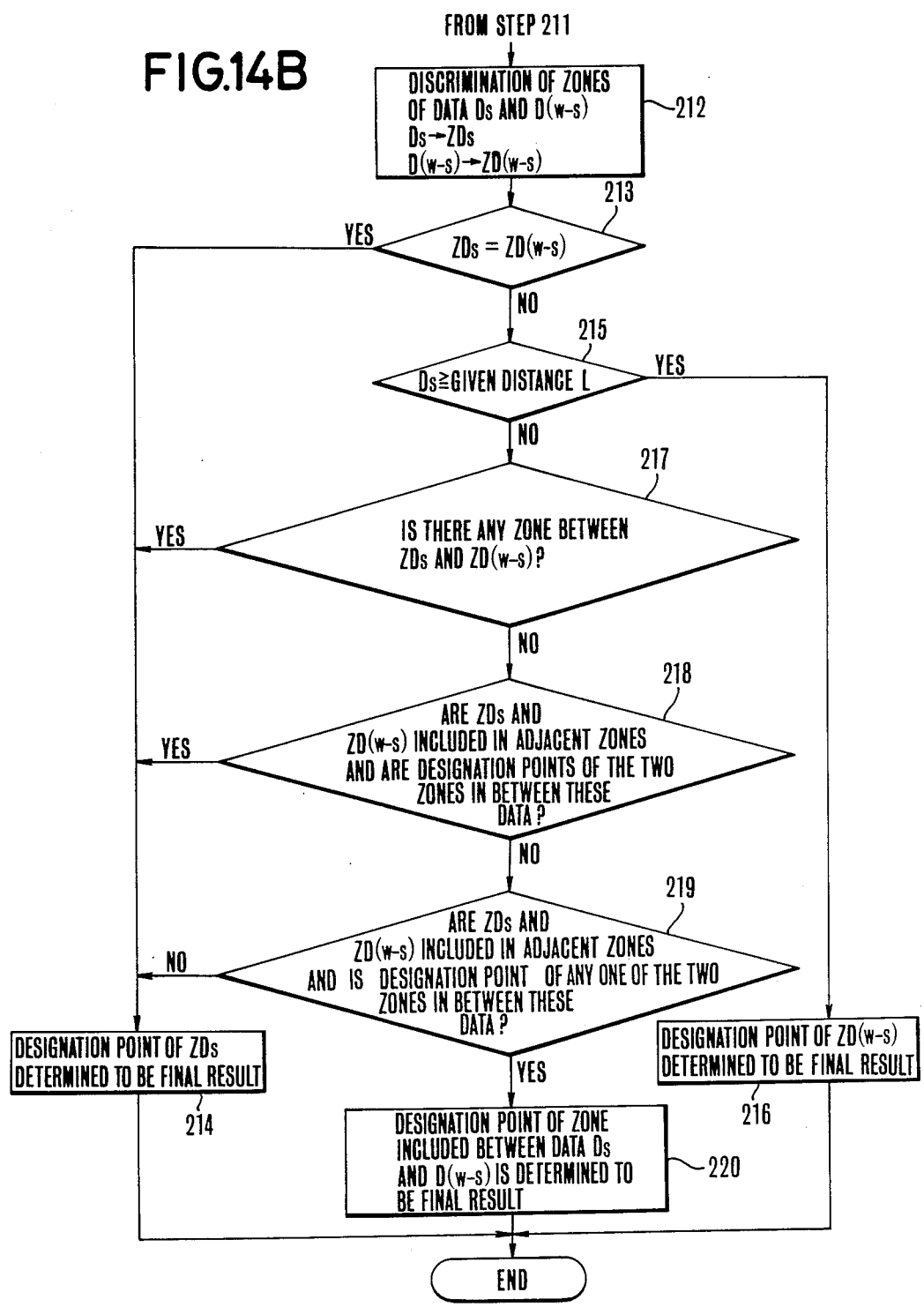

DISTANCE MEASURING DEVICE FOR CAMERA

This is a continuation of application Ser. No. 866,600, filed May 23, 1986, now abandoned.

BACKGROUND OF THE INVENTION

1. Field of the Invention

This invention relates to an improvement on the distance measuring device for a camera capable of measuring distances of a plurality of parts within a photographing field.

2. Description of the Related Art

In automatically detecting a focal point, the conventional photographic camera has been arranged to obtain information on the distance to a photographing object by means of a distance measuring device which performs distance measurement only for the middle part of the photographing field. Therefore, in the event of a picture composition having a main object located at one side of the field, the conventional camera has necessitated the so-called pre-focus operation in which the distance to the object is first measured by placing the main object within a distance measurement mark provided in the middle part of a view finder and then by relocating the object at the desired side position within the field before a photo-taking operation. However, the pre-focus operation is not readily understandable by people unfamiliar with photography. Besides, the improved performance of the automatic focus detecting device of today tends to cause people to forget the necessity of the pre-focus operation and prompts them to perform erroneous photographing operations. Most of blurred pictures result from such negligence.

To solve this problem, an automatic focus detecting device which obviates the necessity of the pre-focus operation by obtaining a plurality of distance measurement data from reflection lights resulting from spot lights projected toward varied spots of the field has been proposed in U.S. patent application Ser. No. 636,590, now abandoned, which has been assigned to the assignee of the present invention. In the case of the device disclosed in this U.S. patent application, however, a main object which is most important to the photographer is handled evenly with subordinate objects. While a picture thus obtained is in focus as a whole, the focus on a specific main object is not sharp enough, because: The plural results of distance measurement are merely averaged and the focal point of a photo-taking lens is adjusted to the averaged distance value. This is a shortcoming of the prior art device. For example, assuming that the automatic focus detecting device arranged to measure the distances of three parts of a field including one middle part and two peripheral parts, only one of the three distance measuring parts may have the main object which is located in the middle part in many cases while other two distance measuring parts are in the background of the field. As a result, the object distance is apt to be detected as a distance much farther than the actual distance.

SUMMARY OF THE INVENTION

This invention is made for the solution of the above-stated problems of the prior art devices. It is therefore a principal object of the invention to provide a distance measuring device for a camera which is provided with first distance measuring means for measuring the distance of approximately the middle part of a photographing field, a second distance measuring means for measuring the distances of approximately the middle and peripheral parts of the field and a switch for selection between the first and second distance measuring means; and is arranged such that: In cases where an object to be mainly photographed is located in a peripheral part of the field, the selection switch is operated to have the distances of the middle and peripheral parts measured to obtain such distance measurement data that enables the photo-taking lens adequately focused on the main object without necessitating any pre-focus operation. In case that the main object is located in the middle part of the field, the distance of the middle part of the field is alone measured to ensure a precise focus on the main object.

The above and further objects and features of this invention will become apparent from the following detailed description of preferred embodiments thereof taken in connection with the accompanying drawings.

BRIEF DESCRIPTION OF THE DRAWINGS

FIG. 1 is a schematic illustration showing the arrangement of a distance measuring device for a camera arranged according to this invention as a first embodiment thereof.

FIG. 2 is a diagram showing the arrangement of the device shown in FIG. 1.

FIGS. 3 to 10 show a second embodiment of this invention.

FIG. 3 is an illustration of the positional relation between light projecting and receiving optical systems.

FIGS. 4(a) and 4(b) are side views of the light projecting and receiving systems taken in the direction of arrow X of FIG. 3.

FIG. 5 is a front view of a light receiving element.

FIG. 6 is a block diagram showing the circuit arrangement of the second embodiment.

FIG. 7 is a front view showing a light receiving element arranged according to this invention as another example.

FIG. 8 is a block diagram showing one example of a circuit arrangement adapted for use of the light receiving element of FIG. 7.

FIG. 9 is a block diagram showing another example of the circuit arrangement.

FIG. 10 is an illustration of a reflection light image differing from an image shown in FIG. 5.

FIG. 13 and 14, 14A, and 14B show a fourth embodiment of this invention, FIG. 13 showing, in a block diagram, the circuit arrangement and FIG. 14 showing, in a flow chart, the operation of the fourth embodiment.

DETAILED DESCRIPTION OF THE PREFERRED EMBODIMENTS

Figure 3:
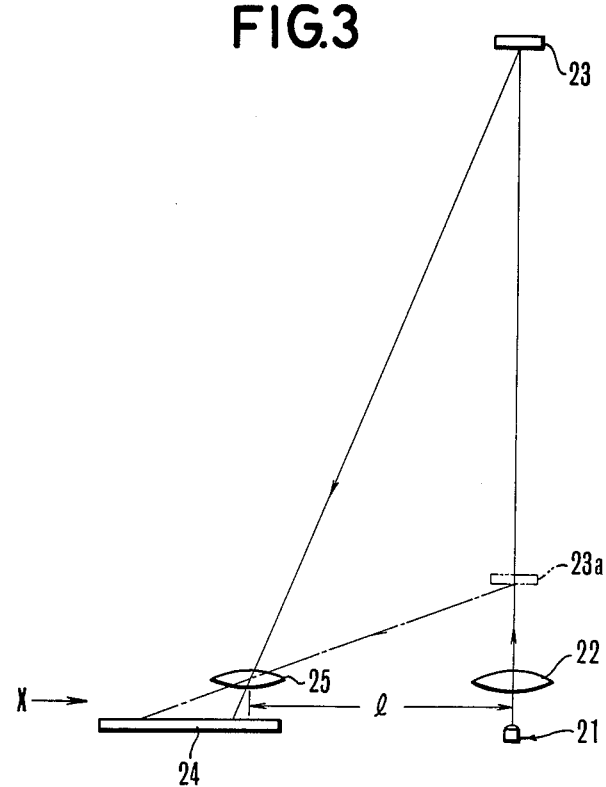

An embodiment of this invention is arranged as described below with reference to the accompanying drawings:

FIG. 1 schematically shows a distance measuring device for a camera arranged as a first embodiment of this invention. The illustration includes light projecting elements 1, 2 and 3 which are arranged to emit signal lights for measuring object distances, respectively. Among these elements, the light projecting element 1 is a high performance light emitting element such as a semi-conductor laser element. The signal light of the element 1 is projected via a light projection lens 4 toward the middle part of the photographing field. The light projecting elements 2 and 3 are inexpensive infrared ray emitting diodes which are popularly used for the remote control devices of television sets. The signal lights of these elements 2 and 3 are projected via the light projection lens 4 toward different peripheral parts of the field. The signal lights which are thus projected toward three different parts of the field are reflected by objects to be photographed. The reflection light of the signal light projected by the light projecting element 1 comes directly to a light receiving element 6. Meanwhile, the reflection lights of the signal lights projected from the light projecting elements 2 and 3 are reflected by mirrors 7 and 8 and then come to the light receiving element 6. A semi-conductor position sensitive device (PSD) is employed as the light receiving element 6. The element 6 is arranged to produce object distance information according to the incident positions and incident light quantities of these three reflection lights. The incident positions of the reflection lights on the light receiving element 6 vary with the distance to the object. The light projecting elements 1, 2 and 3 are aligned perpendicularly to a base line. The mirrors 7 and 8 are arranged to have a common perpendicular plane relative to their reflecting surfaces extend perpendicularly to the base line. Of the above-stated three reflection lights, the lights reflected by objects located at the same distance are arranged to come incident on the light receiving element 6 at one and the same position thereof. A ratio between outputs of two terminals of the light receiving element 6 varies according to the weighted average position of incident light quantities obtained at the incident positions of these reflection lights. The output ratio becomes object distance data.

FIG. 2 shows a circuit arranged to drive the light projecting elements 1, 2 and 3 of FIG. 1. A power supply 9 is a battery such as a lithium battery which has recently come to be used for cameras. This forms a closed power supply circuit of about 6 V. A distance measurement starting switch 10 is arranged to serve also as a release button. The power supply 9 is switched on when the switch 10 is turned on to effect a power supply to each applicable circuit element. Reference numerals 1, 2 and 3 denote the same light projecting elements as those shown in FIG. 1. The light projecting elements 2 and 3 are connected in series to the power supply 9 while the light projecting element 1 is connected in parallel to the elements 2 and 3. A distance measurement control circuit 11, which includes the light receiving element 6 of FIG. 1, is arranged to begin to operate when the distance measurement starting switch 10 turns on and forms the object distance data according to the output of the light receiving element 6. This circuit 11 may be arranged in accordance with the arrangement of a circuit disclosed in Japanese Laid-Open Patent Application No. SHO 57-44809. A known light projecting element driving circuit 12 is arranged as follows: When the distance measurement starting switch 10 is turned on, the circuit 12 applies, in a predetermined cycle, the same voltage to the base of a transistor 13 connected to the light projecting element 1 and that of a transistor 14 connected to the light projecting elements 2 and 3. When the voltage is applied to the bases of the transistors 13 and 14, currents flow to the elements 1, 2 and 3. Then, the light projecting elements 1, 2 and 3 project signal lights of a predetermined frequency corresponding to the cycle in which the voltage is applied to the bases of the transistors 13 and 14. The signal lights are directed to the three places within the field as mentioned in the foregoing. A resistor 15, which is provided for the purpose of setting the current flowing to the light projecting element 1, is connected to the emitter of the transistor 13. A voltage which develops at the connecting node "a" of the resistor 15, is fed back to the light projecting element driving circuit 12. The voltage developed at the node a is proportional to the value of the current flowing to the light projecting element 1. The light projecting element driving circuit 12 controls the voltage to be applied to the transistor 13 in such a way as to make the voltage of the node "a" unvarying and thus to make the value of the current flowing to the element 1 constant.

The same voltage as the voltage applied to the base of the transistor 13 is also applied to the base of the transistor 14 from the light projecting element driving circuit 12 as mentioned in the foregoing. Therefore, the value of current flowing to the light projecting elements 2 and 3 also can be made constant. This permits setting adjustment of the ratio of the current flowing to the elements 2 and 3 to the current flowing to the element 1 simply by adjusting only the resistance value of a resistor 16 which is connected to the emitter of the transistor 14. In other words, with the resistance value of the resistor 16 set at the same value as that of the resistor 15, a current of the same value as that of the current flowing to the light projecting element 1, flows to the light projecting elements 2 and 3. If the resistance value of the resistor 16 is set at a value larger than that of the resistor 15, the value of the current flowing to the elements 2 and 3 becomes smaller than the value of the current flowing to the element 1. Further, this setting adjustment becomes impossible if the transistors 13 and 14 are of different characteristics. It is of course possible to obtain the same advantageous effect by feeding back the voltage of the emitter of the transistor 14 to the above-stated light projecting element driving circuit 12 instead of feeding back the voltage of the node "a" to the circuit 12. A manual selection switch 17 is arranged to permit selection of one of varied distance measuring regions of the field as desired. When the distance measurement starting switch 10 turns on with this selection switch 17 in an ON state, the power supply 9 is switched on to effect a power supply to the light projecting elements 2 and 3 as well as to the light projecting element 1. In this instance, all the light projecting elements 1, 2 and 3 project signal lights. Meanwhile, when the distance measurement starting switch 10 turns on with the selection switch 17 left in an OFF state, the power supply is effected only to the light projecting element 1. It that instance, the element 1 alone projects signal light while other elements 2 and 3 do not project their signal lights.

With the embodiment arranged in the manner as described above, when the distance measurement starting switch 10 is turned on with the selection switch 17 in its ON state for an object which is located in a peripheral part of the field, signal lights are projected from the light projecting elements 1, 2 and 3. Then, distances to the middle part and per peripheral parts of the field are all measured. Information on the distance to the above-stated object thus can be obtained without carrying out the conventional troublesome pre-focus operation although the object is located in the peripheral part of the field.

In case that an object to be photographed is located only in the middle part of the field, the distance measurement starting switch 10 is turned on while leaving the selection switch 17 in an OFF state, the signal light is projected only from the light projecting element 1 while no signal light is projected from other light projecting elements 2 and 3. In this instance, a distance to the middle part of the field is alone measured. By this, the distance information on the object can be prevented from becoming inaccurate due to distance measurement otherwise performed with the signal lights of the elements 2 and 3 for the background.

In taking pictures in general, the main object is located in the middle part of the field in most cases. In snap-shooting, the object is placed in the middle part of the field for 70 to 80 percent of all snap-shots. Therefore, the arrangement of the embodiment to permit accurate distance measurement only for the middle part of the field gives photographs in a satisfactorily focused state in most cases.

Further, the arrangement of this embodiment may be variously modified, for example: A switch similar to the selection switch 17 may be provided on the side of the light projecting element 1. Further, the light projecting elements 2 and 3 may be arranged to be separately drivable in such a manner that, in cases where a main object is located only in one peripheral part of the field, the distance to the object can be measured alone.

In the embodiment described, the signal lights are arranged to be projected toward a total of three parts of the field including a middle part and two peripheral parts. However, the number of the signal-light projecting parts does not have to be three as long as the plurality of parts include one middle part among others.

Further, in the embodiment described, the selection of the distance measuring part is arranged to be made by switching over the light projecting elements from one to another. However, this arrangement may be replaced with some different arrangement, wherein: The reflection lights resulting from the signal lights are arranged to be received by different light receiving elements according to the distance measuring part of the field and a switchover operation is arranged to be performed on these light receiving elements. That arrangement is employed in another embodiment described below:

FIGS. 3 to 10 show a second embodiment. Of these drawings, FIG. 3 shows the arrangement of light projecting and light receiving optical systems in relation to each other. FIGS. 4(a) and 4(b) show them in side views as taken in the direction of arrow X shown in FIG. 3. FIG. 5 shows a light receiving element. These illustrations include light projecting elements 21a, 21b and 21c which are, for example, light emitting diodes arranged to emit near infrared rays as shown in FIG. 4(a). Each of the light fluxes emitted from the light projecting element group 21 is projected via a light projection lens 22 toward an object 23. A light receiving element 24 which is a semiconductor position sensitive device, includes light receiving parts 24a, 24b and 24c. As shown in FIGS. 4(b) and 5, light fluxes Sa, Sb and Sc which are reflected by the object 23 and bear reflection images P1, P2 and P3, come incident upon the three light receiving parts 24a, 24b and 24c via a light receiving lens 25. These light receiving parts 24a, 24b and 24c are separated from each other by dead zones $\alpha$ and $\beta$ which are arranged in parallel with the direction of a base length l. The light receiving part 24b corresponds to the middle part of the photographing field and the parts 24a and 24c to the peripheral parts thereof. The light projecting elements 21a, 21b and 21c are in fixed positions, respectively, in correlation with the light receiving parts 24a, 24b and 24c of the light receiving element 24. The reflection images P1, P2 and P3 formed on the surface of the light receiving element 24 shift their positions toward their positions indicated by broken lines in FIG. 5, accordingly, as the location of the object 23 shifts toward another location 23a. The light receiving element 24 then produces photo currents A1, A2, A3, B1, B2 and B3 from its output terminals according to the positions of the reflection images.

Figure 6:
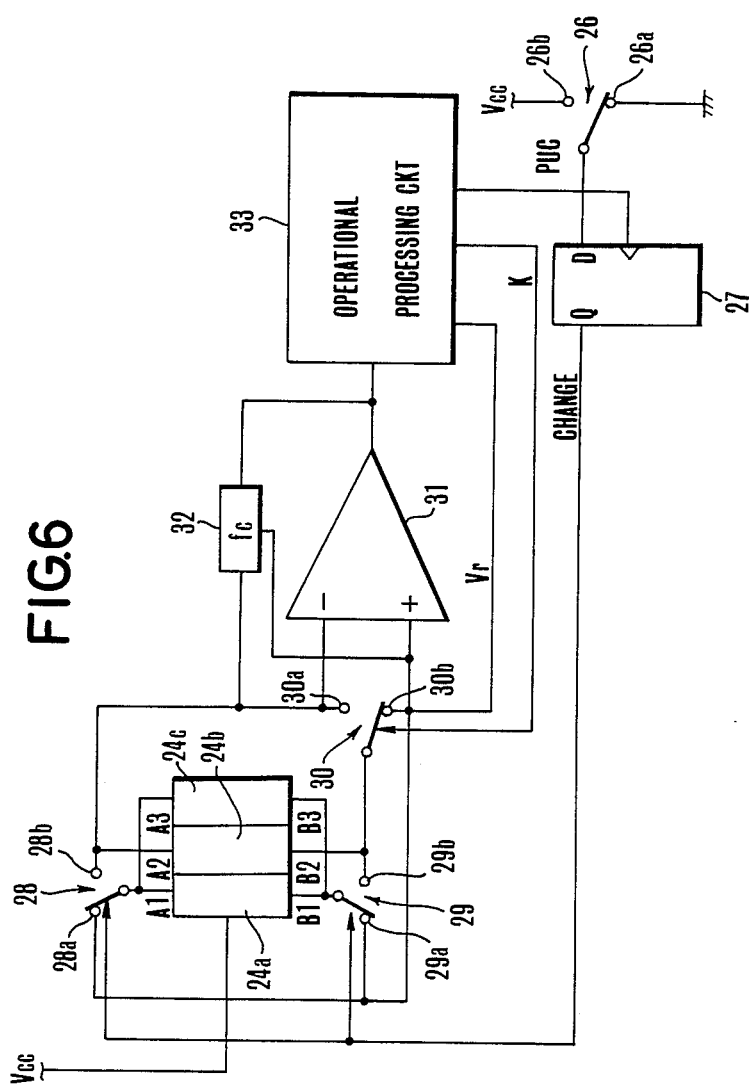

FIG. 6 is a block diagram showing the circuit arrangement of the second embodiment. A switch 26 is arranged to shift the position of its contact piece between a contact 26a (on the ground side) and another contact 26b (on the side of power supply Vcc) in response to a selecting operation performed on a distance measurement field selection button which is not shown but is provided on one side of the camera or in some other suitable position on the camera. When narrow field distance measurement is selected by the selection button 26, the connecting position of the switch 26 is shifted to the contact 26a. The position of the switch 26 shifts to the other contact 26b when wide field distance measurement is selected. A D type filp-flop 27 is arranged to store the position of the switch 26 obtained when an initialization signal PUC is received from an operational processing circuit 33. Field selection switches 28 and 29 are arranged to have their connecting positions respectively shifted to contacts 28a and 29a when a change-over signal CHANGE is supplied thereto at a low level from the D type flip-flop 27 and to other contacts 28b and 29b when the signal CHANGE is supplied at a high level. A computation mode switch 30 is arranged to shift its connecting position to one contact 30a when a computation mode change-over signal K is received from the operational processing circuit 33 at a high level, and to another contact 30b when the signal K is received at a low level. A sensor amplifier 31 is arranged to receive a photo current A or A+B from the light receiving element 24 and to produce a signal voltage VA or VA+VB. A contact voltage Vr is applied to the non-inverting input terminal of the amplifier 31. A feed-back circuit 32 is arranged to determine a conversion constant to be employed in converting the photo current of the light receiving element 24 into a voltage. The operational processing circuit 33 is arranged to produce an initialization signal PUC when the power supply is switched on; to produce a computation mode change-over signal K which is supplied to the computation mode switch 30 to control the selecting operation of the switch 30; to integrate, for example, the signal voltage VA which comes from the sensor amplifier 31 for a given period of time; then to integrate backward the signal voltage VA+VB which comes with some time lag until the integrated value of the signal voltage VA reaches the initial level thereof; and then to compute the ratio between a period of time required for the backward integration and the above-stated given period of time. In other words, the processing circuit 33 obtains distance measurement data by performing a computing operation VA/(VA+VB). This arrangement of the circuit 33 is known, for example, from a circuit disclosed in U.S. patent application Ser. No. 623,771 which corresponds to Japanese Laid-Open Patent Application No. SHO 60-6819.

The embodiment operates as follows: In case that the photographer has selected narrow field distance measurement, the switch 26 is connected to its contact on the ground side. When a shutter release button, which is not shown, is operated to have the power supply switched on under this condition, the initialization signal PUC is generated at the operational processing circuit 33. A sequence control part, which is provided within the circuit 33, is set into its initial state. The signal PUC is then supplied to the D type flip-flop 27. Upon receipt of the signal PUC, the flip-flop 27 stores a low level signal which comes from the switch 26 indicating the state of the switch 26 obtained at this point of time. The flip-flop 27 then produces from its output terminal Q a change-over signal CHANGE at a low level. The low level signal CHANGE is supplied to the switches 28 and 29. The positions of these field selection switches 28 and 29 then shift to their contacts 28a and 29a as shown in FIG. 6. This renders only the light receiving part 24b operative. Therefore, among the light fluxes Sa, Sb and Sc which are projected from the light projecting element group 21 and reflected by the object 23, the light flux Sb (or the reflection image P2) is alone processedd by the light receiving part 24b.

Meanwhile, since the computation mode changeover signal K produced at that time from the operational processing circuit 33 is at a low level, the connecting position of the computation mode switch 30 is shifted to the contact 30b thereof. Therefore, the sensor amplifier 31 receives only the photo current A2 which is generated at the light receiving part 24b. As a result, a signal voltage VA2 which is obtained by converting the photo current A2 into a voltage is supplied to the operational processing circuit 33. After that, when the connecting position of the computation mode switch 30 is shifted to its contact 30a by a high level of the computation mode change-over signal K, the photo currents A2 and B2 come to be supplied to the sensor amplifier 31. Then, the operational processing circuit 33 receives a signal voltage VA2+VB2. With the signal voltages VA2 and VA2+VB2 time serially supplied to the circuit 33 in this manner, the circuit 33 obtains the distance measurement data for the narrow field by performing a computing operation VA2/(VA2+VB2).

Next, in the event of selection of distance measurement for a wide field, the embodiment operates as follows: In this instance, the connecting position of the switch 26 is shifted to the contact on the side of the power supply. Therefore, when the power supply is switched on and the initialization signal PUC is generated at the operational processing circuit 33, the flip-flop 27 produces the change-over signal CHANGE at a high level. The connecting positions of the field selection switches 28 and 29 are shifted to contacts 28b and 29b, respectively. This renders all the light receiving parts 24a, 24b and 24c operative. As a result, the sensor amplifier 31 supplies the operational processing circuit 33 first with a signal voltage VA1+VA2+VA3 and then, after some time lag period, with another signal voltage (VA1+VA2+VA3)+(VB1+VB2+VB3). Upon receipt of these signals, the circuit 33 performs a computing operation in a manner similar to the operation mentioned in the foregoing according to these signal voltages. By this, distance measurement data for the wide field is obtained.

Figure 9:
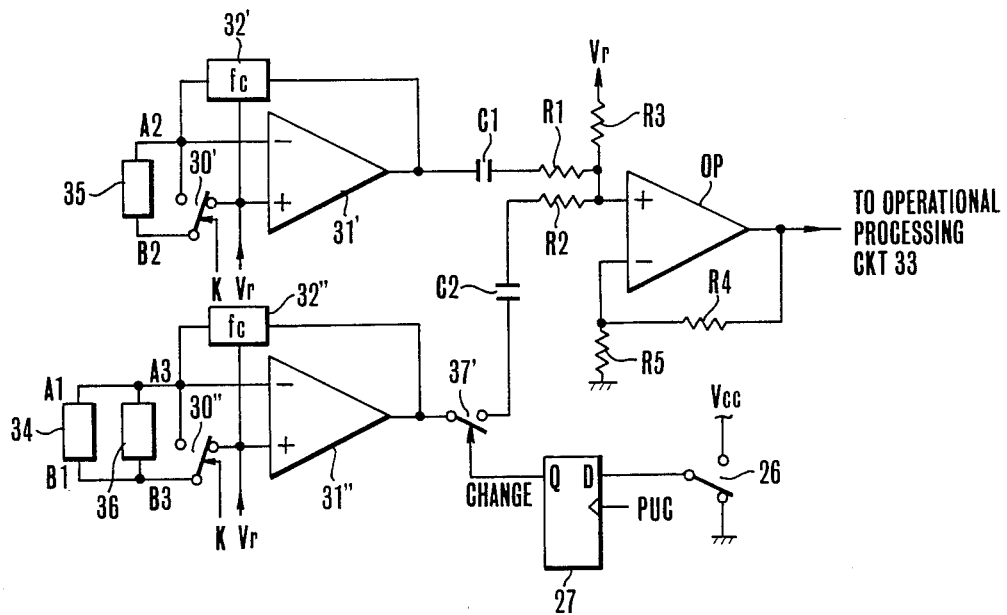

In the case of the embodiment described above, one light receiving element 24, which is divided into three light receiving parts 24a, 24b and 24c, is used. However, this arrangement may be changed to use three independent light receiving elements 34, 35 and 36 as shown in FIG. 7 instead of one divided light receiving element. In this instance, the circuit arrangement may be changed in a manner as shown in FIG. 8, in which field selection switches 37 and 38 are arranged to turn on or off according to the signal supplied from the D type flip-flop 27, that is, to turn on upon receipt of a high level change-over signal CHANGE and to turn off upon receipt of a low level change-over signal CHANGE. Another conceivable circuit arrangement suited for the use of three independent light receiving elements is arranged as shown in FIG. 9. In this case, the circuit arrangement comprises a sensor amplifier 31' which converts the photo current generated at the light receiving element 35 into a signal voltage VA2 or VA2+VB2 according to the switching operation of a switch 30' and a feedback circuit 32'; a sensor amplifier 31" which converts the photo currents generated at the light receiving elements 34 and 36 into a signal voltage VA1+VA3 or (VA1+VA3)+(VB1+VB3) according to the operation of a switch 30" and a feedback circuit 32"; a field selection switch 37' which turns on or off according to the signal voltage supplied from the sensor amplifier 31' via a capacitor C1 and the change-over signal CHANGE coming from the D type flip-flop 27; and an addition circuit which consists of resistors R1 to R5 and an operational amplifier OP and is arranged to add the signal voltage coming via a capacitor C2 to the above-stated signal voltage and to supply the result of addition to the above-stated operational processing circuit 33 (in case that the wide field distance measurement is selected). According to the circuit arrangement of FIG. 9, the number of amplifiers increases. However, this arrangement is advantageous in such a case where the output of the amplifier tends to become saturated when the brightness of the object increases.

In the embodiment described, both the distance measuring field region and the light receiving surface of the light receiving element are respectively divided into three parts. However, the number of divisions is of course not limited to three. Further, the reflection images P1 and P3 which are formed on the light receiving parts 24a and 24c of FIG. 5 and are to be handled as one and the same distance information, may be changed to be formed via an optical system on one and the same light receiving part 24a or 24c instead of on both of them; or these light receiving parts 24a and 24c may be arranged as one and the same part on the light receiving element 24. Three light emitting elements are employed as light projecting means. However, as mentioned in the foregoing, this arrangement may be changed to optically and mechanically split the output of one light emitting element by means of a beam splitter, a reflecting mirror or the like. Such modification will be advantageous in terms of cost.

Figure 10:
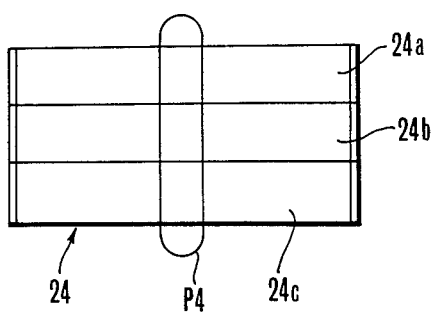

In the case of FIG. 5, it is arranged to receive a plurality of reflection images P1, P2 and P3. However, this may be replaced by arrangement to receive a single reflection image P4 as shown in FIG. 10. This reflection light image P4 results from use of a light projecting element which is arranged to project a spotlight in an elliptical shape. The use of this light projecting element is advantageous in respect of that the positional adjustment of the light projecting element relative to the base length and in the vertical direction does not have to be precise and that the middle and peripheral parts of the picture plane can be variously weighted. On the other hand, however, positioning the middle light receiving part to be used for narrow field distance measurement relative to the base length and in the vertical direction becomes somewhat difficult. It is another disadvantage that the field range increases in the event of narrow field distance measurement.

In case that the operational processing means includes a micro-computer, the micro-computer may be arranged to serve also as distance measuring field changeover means.

In this specific embodiment, the selection between the narrow field distance measurement and the wide field distance measurement is arranged to be made according to the location of the distance measuring object within the light projecting range. However, the arrangement for the wide field distance measurement may be replaced with an arrangement for peripheral field distance measurement to be carried out solely in response to a signal produced from a second light receiving part provided around a first light receiving part. In the embodiment, the narrow field distance measurement range is located in the middle part of the light projecting range. However, it is not limited to the middle part. In the event of such altered location of the narrow field distance measurment region, the above-stated peripheral field distance measurement region may be located adjacent to the narrow field distance measurement region.

In the first and second embodiments given in the foregoing, the distance measuring field is electrically switched over from one field to the other in response to a switch operation. Therefore, the change-over between narrow field distance measurement and wide field distance measurement which has been difficult by the conventional device can be accomplished without difficulty. However, in cases where the invented device is to be included in a so-called full automatic camera, there arises a question as to how to properly make selection between the narrow field distance measurement and the wide field distance measurement.

Figure 11:
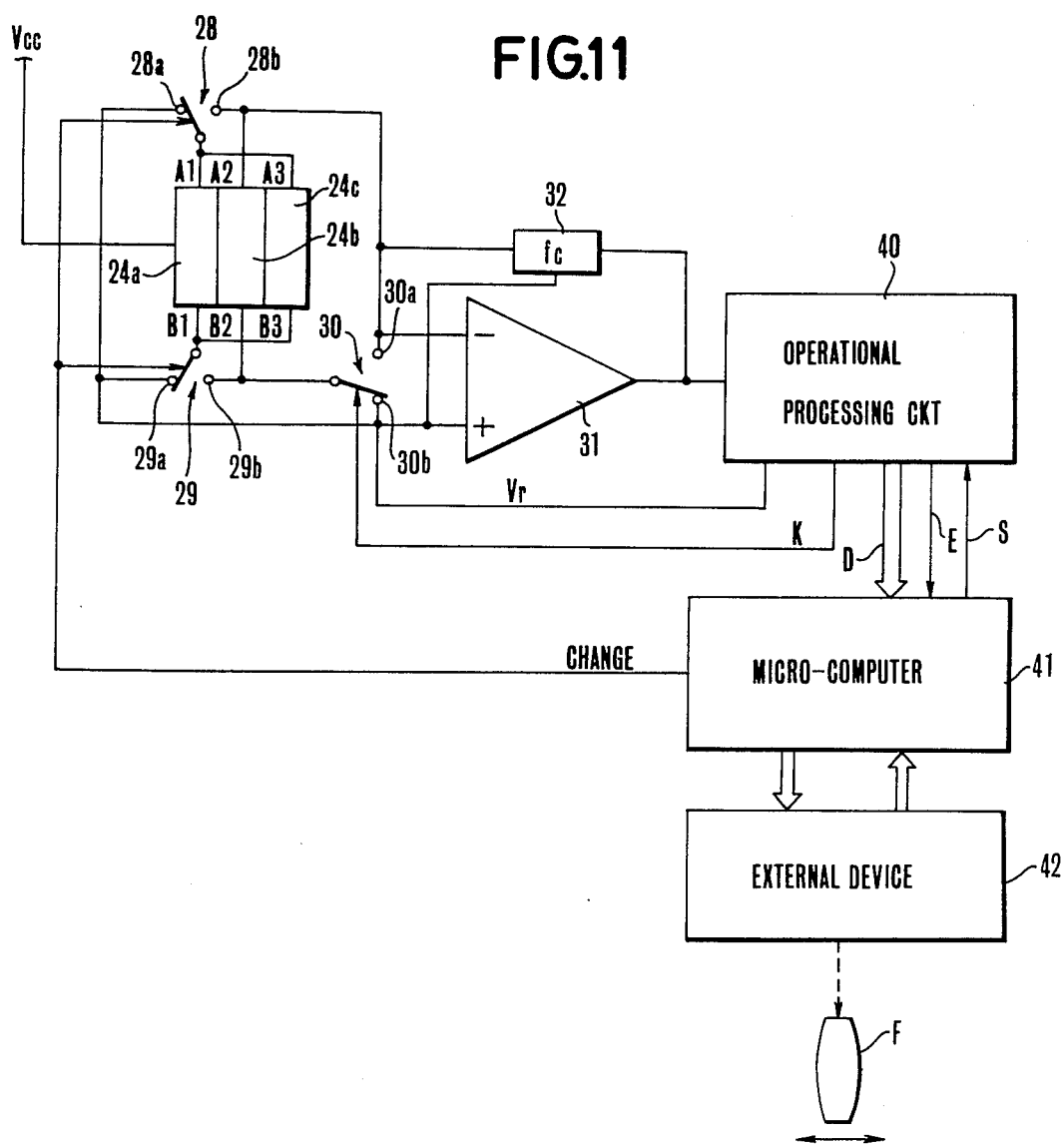
FIGS. 11 and 12 show a third embodiment of this invention, FIG. 11 showing, in a block diagram, the circuit arrangement of the embodiment and FIG. 12 showing the operation thereof in a flow chart.
Figure 12:
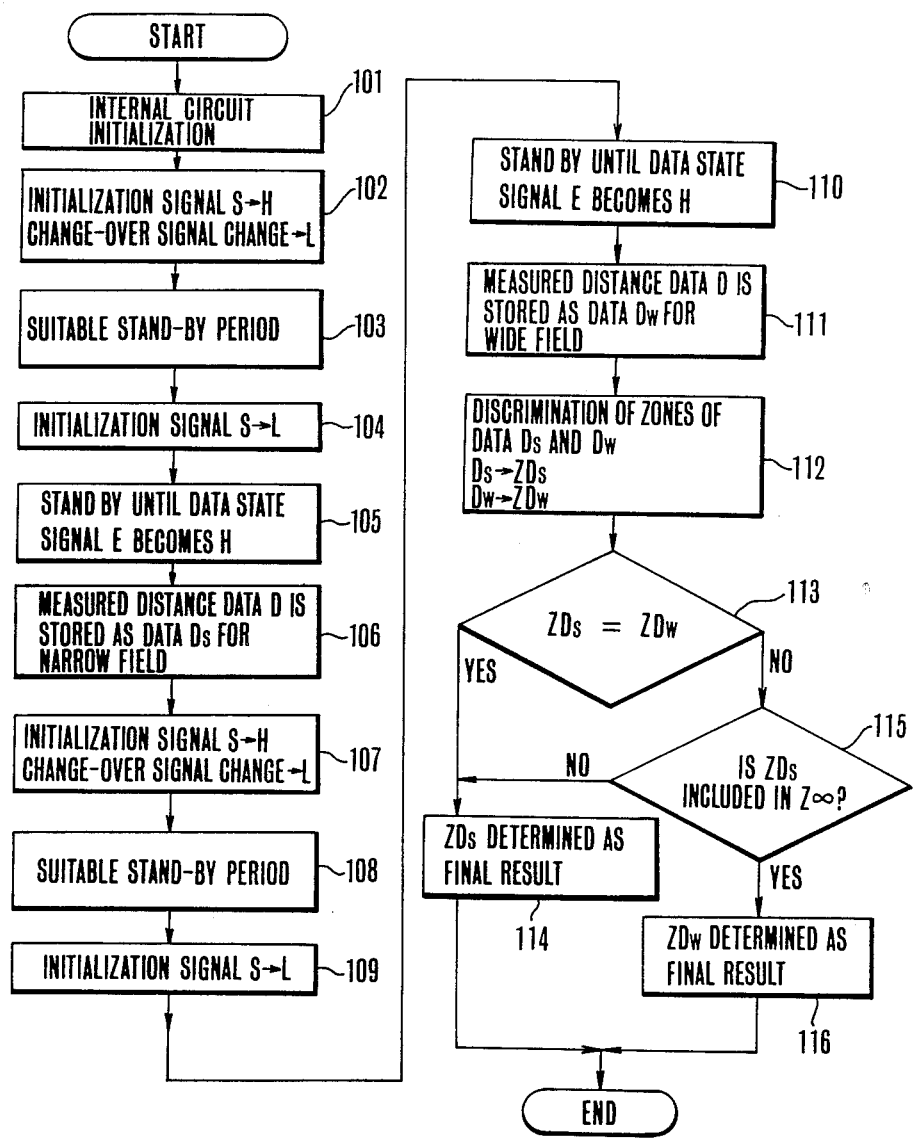

In view of this, in the following description of a third embodiment, a distance measuring device is arranged according to this invention to be capable of automatically selecting measured distance data better suited for a main distance measuring object: The third embodiment is arranged as shown in FIGS. 11 and 12. The same parts as those of the second embodiment are indicated by the same reference numerals and the details of them are omitted from the description given here. FIG. 11 shows the embodiment in a circuit diagram suited for application to a camera. Referring to FIG. 11, an operational processing circuit 40 is arranged in a manner similar to the circuit 33 of FIG. 6 but differs in the following point: In the case of the operational processing circuit 33 of the preceding example shown in FIG. 6, an initialization process is accomplished by an initialization signal PUC automatically generated within the circuit 33 when the power supply is switched on. Whereas, the operational processing circuit 40 of the third embodiment is provided with no initializing signal generating part but is arranged in combination with a micro-computer 41 which enables the circuit 40 to operate as follows: The initialization process is accomplished by means of an initialization signal S produced from the micro-computer 41. The circuit 40 produces a data state signal E which shows whether or not measured distance data E presently transmitted to the micro-computer is correct. More specifically, the data state signal E is produced at a high level when the data D is correct and thus the distance measuring operation has come to an end, and at a low level if not. The embodiment is provided with a commercially available micro-computer 41, which controls such external devices as a lens driving device, etc., according to the measured distance data D coming from the operational processing circuit 40; and controls the switching operations of field selection switches 28 and 29. In other words, the micro-computer 41 supplies a change-over signal CHANGE to the field selection switches 28 and 29 for automatically selecting either the narrow field or the wide field for distance measurement. The third embodiment operates as described below with reference to FIG. 12 which shows it in a flow chart:

When the power supply is switched on in response to a pushing operation performed on a shutter release button, this is detected by a power supply rise detecting part provided within the micro-computer 41. All the parts within the micro-computer 41 are reset. Immediately after completion of resetting, internal peripheral circuits such as I/O ports, etc. are initialized. Thus, at a step 101, the micro-computer 41 becomes ready for controlling each of applicable external circuits. The micro-computer 41 first supplies the change-over signal CHANGE at a low level to the field selection switches 28 and 29 and the initialization signal S at a high level to the operational processing circuit 40, respectively at a step 102. After the lapse of a sufficiently long period of time for initializing the circuit 40, the level of the initialization signal S changes to a low level at steps 103 and 104.

The operational processing circuit 40 is initialized after receipt of the initialization signal S. The circuit 40 supplies the micro-computer 41 with a data state signal E at a low level indicating that the measured distance data D being presently transmitted is not a valid signal and the distance measuring operation has not come to an end as yet. When the level of the initialization signal S changes to a low level, the circuit 40 supplies a computation mode change-over signal K at a low level to the switch 30 to shift thereby the connecting position of the switch 30 to one contact 30$b$ thereof. The switch 30 thus causes a distance measuring operation to begin. The distance measuring operation is performed in the same manner as in the case of the second embodiment shown in FIG. 6. First, the photo current A2, which is generated at the light receiving part 24$b$ is produced as a signal voltage VA2. Following this, another photo current A2+B2 is produced as a signal voltage VA2+VB2. Upon receipt of these signals, the circuit 40 performs a computing operation VA2/(VA2+VB2). Measured distance data for the narrow field is thus obtained and is transferred to the micro-computer 41.

The micro-computer 41 stands by at a step 105 until receipt of the data state signal E at a high level from the operational processing circuit 40. Upon receipt of the high level data state signal E, the micro-computer 41 takes in the measured distance data D obtained at that point of time as valid data. The content of the data is then stored at an internal memory part at a step 106 as data Ds representing the result of the narrow field distance measurement. Next, to have the wide field distance measurement performed, the micro-computer 41 produces the change-over signal CHANGE at a high level to shift thereby the connecting positions of the field selection switches 28 and 29 to their contacts 28$b$ and 29$b$ respectively. At the same time, the micro-computer 41 produces again the initialization signal S at a high level at a step 107 to initialize the operational processing circuit 40. After the lapse of a suitable period of time, the level of the initialization signal S is brought back to a low level at steps 108 and 109. Then, a distance measuring operation is performed for a wider field by using the photo currents A1, A2, A3, B1, B2 and B3 produced from all the light receiving parts 24a, 24b and 24c. The operational processing circuit 40 then performs a computing operation (VA1+VA2+VA3)/{(VA1+VA2+VA3)+(VB1+VB2+VB3)}. After this, the micro-computer 41 stands by until arrival of the data state signal E at a high level at a step 110. Upon receipt of the high level data state signal E, the micro-computer 41 takes in measured distance data D which is obtained at that time as valid data. The content of this data is then stored at the internal memory part as data Dw of the wide field distance measurement at a step 111. With the data Ds and Dw for both the narrow and wide field distances thus stored, each of the results of distance measurement is examined to find one of various zones determined by a lens driving system to which it belongs. Then, zone data ZDs for the narrow field and zone data ZDw for the wide field are obtained at a step 112. Following this step, a discrimination is made to see if the zone data ZDs and ZDw coincide with each other, i.e. whether they are included in the same zone or not, at a step 113. If they are found to coincide with each other, the zone data ZDs obtained for the narrow field is determined to be the final distance measurement data at a step 114. Then, an external device 42 is controlled as necessary for focal point adjustment by shifting the position of a photo-taking lens to the specific zone. In the event of disagreement of these zone data, a discrimination is made to find whether the zone data ZDs of the narrow field is included in an infinity distance zone $Z_\infty$ at a step 115. If it is found to be included in the infinity distance zone, the zone data ZDw of the wide field is determined as the final distance measurement data at a step 116. In that event, the external device 42 is controlled as necessary in the same manner as mentioned above. This arrangement solves the problem that: In photographing two persons, for example, if the lens is focused on an object located at an infinity distance through a space existing between the two persons, their images would come out of focus. In case that the zone data ZDs is found not to be included in the infinity distance zone $Z_\infty$, this zone data ZDs is determined to be the final distance measurement data and is supplied to the external device 42 for shifting the lens F accordingly.

In this embodiment, distance measurement data is obtained both under the narrow and wide field distance measuring conditions by utilizing the fact that the field of distance measurement is readily shiftable from one field to another. Then, in case that the distance measurement data obtained by the narrow field distance measurement is not included in the infinity distance zone, the measured distance data obtained at that time is determined to be the final result of distance measurement on the concept that a main photographing object is generally placed in the middle part of the picture plane. In the event that the distance measurement data obtained by the narrow field distance measurement is included in the infinity distance zone, the distance measurement data obtained by the wide field distance measurement is used as the final measured distance data by taking advantage of the wide field distance measurement. Thus, the selection between the narrow and wide field distance measuring operations is not left to the discretion of the photographer but is automatically made in a manner that is assumed to be better suited for the main object. The embodiment, therefore, can be employed in a full automatic camera.

Further, in this embodiment, the narrow field distance measuring region is assumed to be located in the middle part of the photographing field. However, this invention is not limited to this assumption. In case that the narrow field distance measuring region is not in the middle part, the peripheral field distance measuring region mentioned in the foregoing is also not limited in the peripheral region but in any other region as long as it is adjacent to the narrow field distance measuring region. Although the embodiment is arranged to always obtain measured distance data for both the narrow and wide distance measuring regions, this arrangement may be changed to first measure the distance of the narrow field and, if the zone ZDs obtained as a result of this measurement is found not included in the infinity distance zone $Z_\infty$, to shift the lens position to the zone ZDs. In that event, such arrangement obviates the necessity of carrying out distance measurement for the wide field.

The infinity distance zone $Z_\infty$ varies with the aperture value of the camera. In other words, the photographable range of the camera varies with the aperture value. Therefore, the arrangement to determine the lens shifting zone solely on the basis of "whether or not the zone data ZDs resulting from the narrow field distance measurement is included in the zone $Z_\infty$" might be insufficient in some cases. In such a case, if the zone ZDs is farther than a certain zone, it might be the distance of the background. In other words, measuring a distance nearer than the zone might more likely give a distance to the desired photographing object. Therefore, in that event, the discriminating condition may be changed, for example, to a discrimination between the infinity distance zone and a zone immediately before the infinity distance zone.

Further, in the embodiment, when measured distance data obtained under the narrow field distance measuring condition is farther than a given distance, measured distance data obtained under the wide field distance measuring condition is employed as the final result of distance measurement. However, that arrangement may be changed to select, as the final result of distance measurement, the measured distance data obtained under a peripheral field distance measuring condition which accepts only the signal produced from the second light receiving part instead of the result of the wide field distance measurement. The same alteration is of course applicable also to a case where the measured distance data obtained under the narrow field distance measuring condition is not farther than the given distance.

Figure 13:
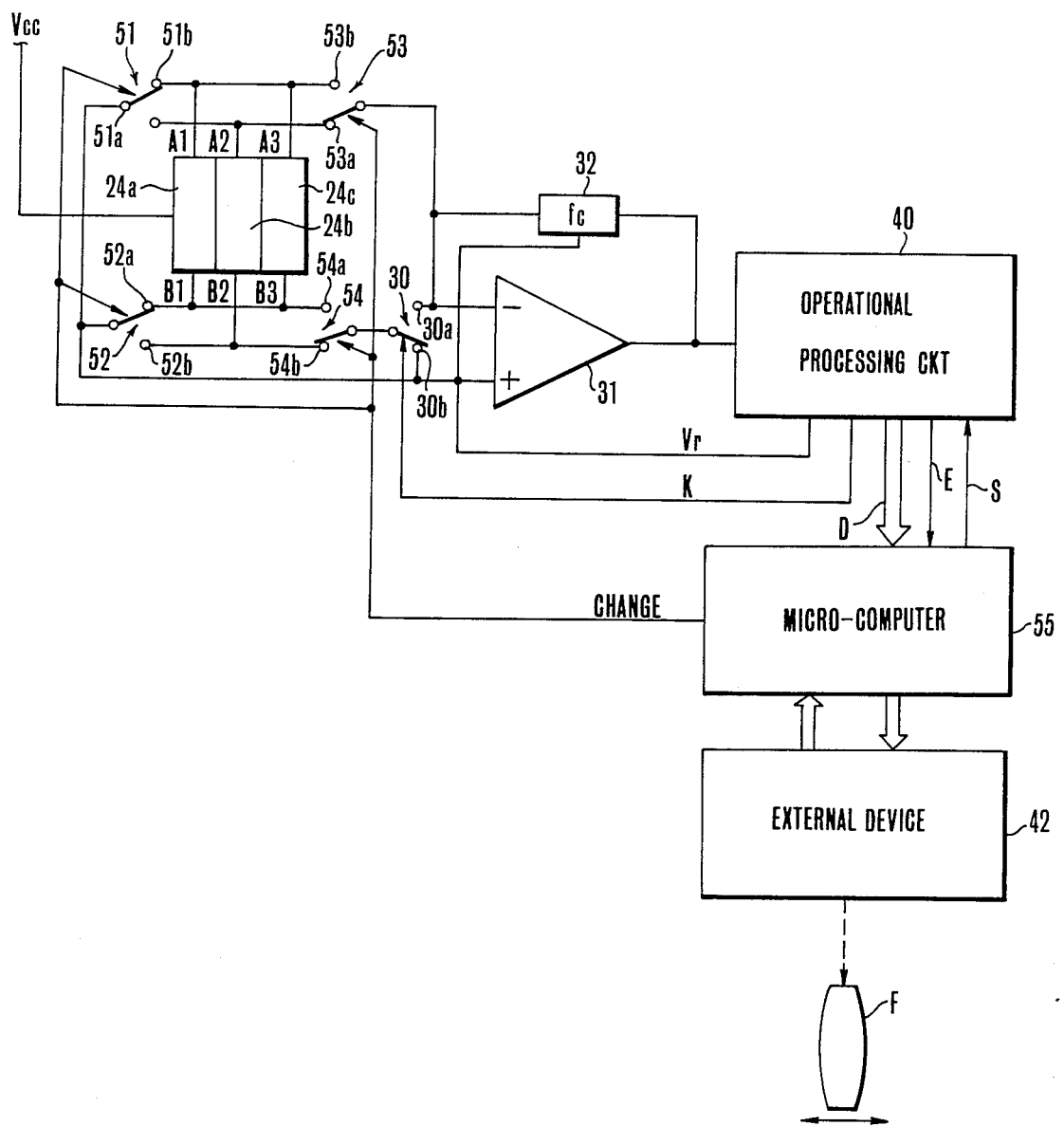

A fourth embodiment, of this invention embodies by way of example, the above-stated arrangement. FIG. 13 shows the fourth embodiment in a block diagram as in a state of being incorporated in a camera. In FIG. 13, the parts similar to those of the second and third embodiments are indicated by the same reference numerals and the details of them are omitted from the following description:

Field selection switches 51, 52, 53 and 54 are arranged to shift their connecting positions to contacts 51b, 52a, 53b and 54a when a change-over signal CHANGE is supplied to them at a high level from a micro-computer 55 and to shift their positions to contacts 51a, 52b, 53a and 54b when the change-over signal CHANGE is supplied at a low level. An operational processing circuit 40 is arranged in the same manner as the circuit 40 of FIG. 11. The micro-computer 55 is arranged in a manner similar to the micro-computer 41 of FIG. 11. The micro-computer 55 operates on the basis of measured distance data received from the operational processing circuit 40 to control an external device 42 such as a lens driving device or the like and to control the switching operation of the field selection switches 51 to 54. More specifically, the micro-computer 55 produces and supplies the change-over signal CHANGE to these switches 51 to 54 for automatically selecting either a narrow field or a wide field for distance measurement.

Figure 14:
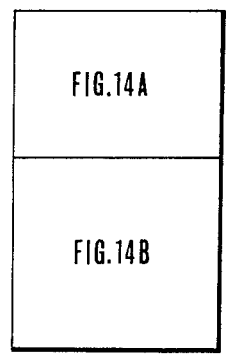
Figure 14A:
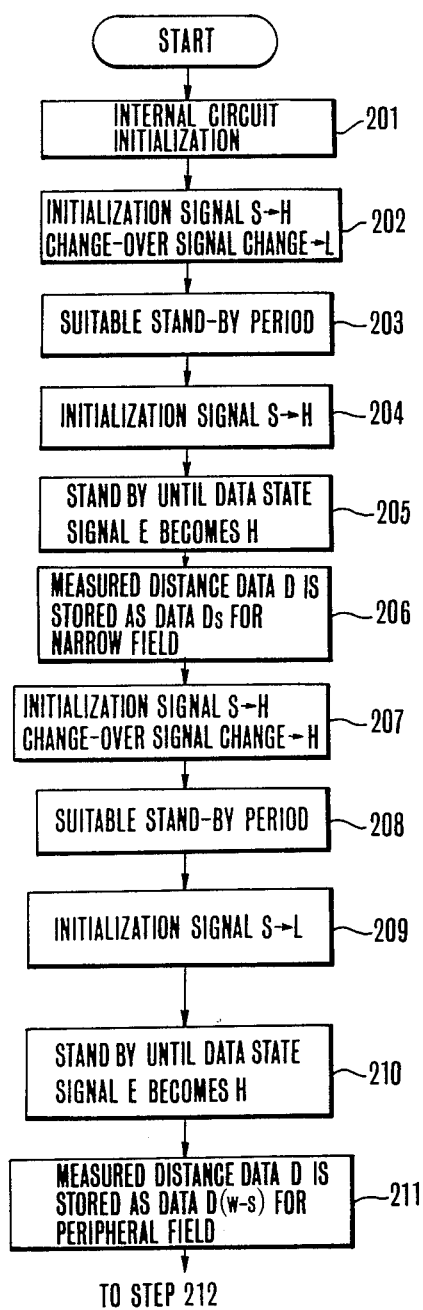

Referring to FIG. 14 which is a flow chart, the fourth embodiment operates as follows: When the power supply is switched on, it is detected by a power supply rise detecting part provided within the micro-computer 55 and the micro-computer is reset. Then, the internal peripheral circuits such as I/O ports, etc. of the micro-computer 55 is initialized immediately after release from a resetting state. The micro-computer 55 thus becomes ready for controlling each of applicable external circuits at a step 201. To have narrow field distance measurement first carried out, the micro-computer supplies the change-over signal CHANGE at a low level to the field selection switches 51 to 54 and supplies an initialization signal S at a high level to the operational processing circuit 40 at a step 202. The level of the initialization signal S is changed to a low level after the lapse of a period of time long enough for the initialization of the operational processing circuit 40 at steps 203 and 204.

Upon receipt of the high level initialization signal S, the operational processing circuit 40 is initialized. The circuit 40 then supplies the micro-computer 55 with a data state signal E at a low level indicating that the distance measurement data D which is presently being transmitted is an invalid signal and that a distance measuring operation has not been completed as yet. Further, when the level of the initialization signal S changes to the low level, the circuit 40 supplies a computing mode change-over signal K at a low level to a switch 30. The connecting position of the switch 30 is shifted to one contact 30b thereof by this low level signal K. This causes a distance measuring operation to begin. The distance measuring operation is performed in the same manner as in the case of the preceding example of embodiment. First, the photo current A2, which is generated at the light receiving part 24b, is obtained as a signal voltage VA2. Then, the computing mode change-over signal K produced from the circuit 40 becomes a high level signal to cause thereby the position of the switch 30 to shift to the contact 30a of the switch. Following this, another photo current A2+B2 is obtained as a signal voltage VA2+VB2. Therefore, the operational processing circuit 40 performs a computing operation VA2/(VA2+VB2) to obtain distance measurement data for the narrow field. The data is supplied to the micro-computer 55.

At a step 205, the micro-computer 55 stands by until arrival of a data state signal E at a high level from the operational processing circuit 40. Upon receipt of the high level data state signal E, the micro-computer 55 takes in the distance measurement data D obtained at that time as valid data. The content of the data is then stored at the internal memory part of the micro-computer as data Ds representing the result of narrow field distance measurement (a step 206). Next, to have peripheral field distance measurement carried out for a distance to an area around the middle part of the image plane, i.e. a peripheral region obtained by removing the narrow field from the so-called wide field, the micro-computer produces the change-over signal CHANGE at a high level and supplies the high level signal to the field selection switches 51 to 54. The connecting positions of these switches are shifted to their contacts 51b, 52a, 53a and 54b respectively. At the same time, the operational processing circuit 40 is initialized by the computer (a step 207). After the lapse of a suitable period of time, the level of the initialization signal S is brought back to a low level (steps 208 and 209). Following this, a distance measuring operation is performed for the peripheral field distance by using the photo currents A1, A3, B1 and B3 obtained from the light receiving parts 24a and 24c. The circuit 40 then performs a computing operation (VA1+VA3)/(VA1+VA3)+(VB1+VB3). After that, the micro-computer 55 stands by until the data state signal E is supplied at a high level from the circuit 40 in the same manner as stated above (a step 210). Upon receipt of the high level data state signal E, the micro-computer 55 takes in the distance measurement data D obtained at that time as valid data. The content of the data is stored at the internal memory part as data D(w-s) (a step 211).

The data Ds which represents a distance to the narrow field region corresponding to the middle part of a photographing image plane and the data D(w-s) which represents a distance to the peripheral field region corresponding to the peripheral part of the image plane are thus stored through the processes described above. The micro-computer 55 then examines these data to find to which of the zones determined by the lens driving system of the camera these data belong. The micro-computer 55 thus prepares zone data ZDs representing the result of the narrow field distance measurement and zone data ZD(w-s) representing that of the peripheral field distance measurement (a step 212). Then, a lens position to which the lens is to be actually shifted is determined through steps 213 to 220 which are carried out as described below:

(1) In case that the zone data ZDs and ZD(w-s) are included in one and the same zone, a point in the zone designated by the data Ds (or the zone data ZDs) representing the result of narrow field distance measurement is decided to be the lens position. In this case, photographing objects located in the middle and peripheral parts of the image plane are in the same zone within the depth of field and a photographing operation is performed for this zone.

(2) In case that the data Ds of the narrow field distance measurement is either equal to a given distance L which can be regarded as the background or a far distance, a designated point in the zone in which the data D(w-s) of the peripheral distance measurement is included is decided to be the lens position. This arrangement is advantageous, for example, in a case where two persons are separately located on the left and right sides of the middle part of the image plane. The above-stated given distance is set at a value which varies with the distance measurable limit, precision and resolving power of the distance measuring system; the range of each of the divided zones; expected ambient conditions; and other specifications of the camera.

(3) In cases where the data Ds and D(w-s) are included in different zones with one or more other zones in between their zones, a designated point in the zone in which the data Ds representing the result of the narrow field distance measurement is included is decided to be the lens position. In this instance, it is impossible to sharply photograph both objects locating in the middle and peripheral parts of the image plane. One of them cannot be sharply photographed. Unlike in the case of paragraph 2) above, the object located in the middle part of the image plane cannot be firmly determined to be the background. Therefore, in this instance, the lens is focused on the object located in the middle part of the image plane in accordance with the concept that an object most desired by the photographer is generally located in the middle of the image plane.

In the event of a system which excels in resolving power and is capable of dividing the distance measuring region more finely than the designating zones divided for the lens, the lens position is determined as follows:

(4) In case that the data Ds and the data D(w-s) are respectively included in two adjacent zones with the designated points of the two zones located in between the data Ds and D(w-s), the designated point of the zone in which the data Ds representing the result of the narrow field distance measurement is included is decided to be the lens position. This arrangement is based on the same concept as paragraph (3) above.

(5) In case that the data Ds and D(w-s) are respectively included in two adjacent zones but, unlike in the case of paragraph (4), the designated point of only one of the two adjacent zones is located in between the data Ds and D(w-s), this designated point is decided to be the lens position. While it is impossible to sharply photograph both the object located in the middle and peripheral parts of the image plane also in this instance, the blurring degree of the image of an object located in the part not selected can be lessened by deciding the lens position in this manner.

(6) If the data Ds and D(w-s) are both included in a part between the designated points of two adjacent zones unlike in the case of paragraph (5) above, the designated point of the zone in which the data Ds representing the result of narrow field distance measurement is included is decided to be the lens position. This is also based on the same concept mentioned in paragraph (3) above.

With the position to which the lens is to be actually shifted obtained in this manner, the focal point of the lens is adjusted by controlling the external device (which is assumed to be a lens driving device in this embodiment) to have the lens F shifted to the position. Further, if the micro-computer 55 is capable of carrying out complex computation within a short period of time, the lens position can be adjusted to a position where a minimal degree of blur is obtainable by computing a warrantable blurring degree for every zone with the aperture fully opened in the case of paragraph (6) above.

In this specific embodiment, since the distance measuring field can be easily switched over from one field to another, the distance measurement data is obtained under both the narrow field distance measuring condition and the peripheral field distance measuring condition. In case that these distance measurement data differ from each other, a discrimination is made to find whether the distance measurement data representing the result of the narrow field distance measurement indicates a distance farther than a given distance. If it is found to be farther, the distance measurement data representing the result of the peripheral field distance measurement is employed as the final measured distance data. If not, the two data are compared with each other and one of them is employed as the final measured distance data. Therefore, the embodiment automatically gives, without leaving the selection to the discretion of the photographer, one of the distance measurement data likely better suited to the main object which is aimed at in general.

Another advantage of this embodiment resides in that: Distance measurement data only for a peripheral object becomes obtainable while it has been hardly obtainable by wide field distance measurement because it is inevitably affected by an object located in the middle part of the image plane.

In the embodiment described, if the distance measurement data obtained by the narrow field distance measuring condition is found to be farther than a given distance, the distance measurement data obtained under the peripheral field distance measuring condition is decided to be the final measured distance data as mentioned above. However, this arrangement may be changed to use, as the final data, a result of wide field distance measurement obtained on the basis of signals produced from first and second light receiving parts. The same modification is of course applicable also to a case where the distance measurement data representing the result of the narrow field distance measurement is not farther than the given distance.

While the arrangement of this embodiment is made on the assumption that the narrow field distance measuring region is located in the middle part of a light projecting range. However, this invention is not limited to this assumption. Further, the peripheral field distance measuring region may be replaced with any region other than the peripheral region as long as the region is adjacent to the narrow field distance measuring region.

In accordance with this invention, a distance measuring device for a camera comprises first distance measuring means arranged to measure the distance of the middle part of the field; second distance measuring means arranged to measure the distances of the middle and peripheral parts of the field; and a switch arranged to make selection between the first and second distance measuring means. In case that the main object is located in a peripheral part of the field, the switch is operated to have the distances of both the middle and peripheral parts of the field measured. The measured distance data thus obtained enables the lens to be adequately focused on the main object without recourse to the conventional troublesome pre-focus operation. In case that the main object is located only in the middle part of the field, the distance of the middle part of the field is alone measured to ensure a precise focus on the main object, so that the possibility of an inadequate focus which tends to result from the use of a distance measuring device arranged to be capable of measuring distances to a plurality of parts of the field. The distance measuring device according to this invention thus excels in performance and operability and is, therefore, highly advantageous for application to cameras.

What is claimed is:

1. A device for forming a focal adjustment information for a camera, comprising:

(A) first distance measuring means for measuring a distance of a roughly central portion of a scene to be photographed;
(B) second distance measuring means for measuring a distance of a roughly peripheral portion of the scene or the distance of the roughly central portion and the roughly peripheral portion of the scene; and
(C) control means for forming the focal adjustment information by preferentially using the distance measurement obtained by said first distance measuring means when the distance measurement by said first distance measuring means and the distance measurement by the second distance measuring means are not in a range coverable by a field depth.

2. A focal distance information forming device for a camera, comprising:
(A) first distance measuring means for measuring a distance of a roughly central portion of a scene to be photographed;
(B) second distance measuring means for measuring a distance of a roughly peripheral portion of the scene or the distance of the roughly central portion and the roughly peripheral portion of the scene; and
(C) control means for forming a focal adjustment information by preferentially using the distance measurement obtained by said first distance measuring means in case when said distance measurement by the first distance measuring means is within a predetermined distance range.

3. A device according to claim 2, wherein said control means forms the focal adjustment information by preferentially using the distance measurement obtained by said second distance measuring means when the distance measurement obtained by said first distance measuring means is not within said predetermined distance range.

4. A device according to claim 2, wherein said control means forms the focal adjustment information by using the distance measurement obtained by said first distance measuring means without using the distance measurement obtained by the second distance measuring means when the distance measurement obtained by said first distance measuring means is within said predetermeined distance range.

5. A device according to claim 2, wherein said control means forms the focal adjustment information on the basis of the distance measurement obtained by said second distance measuring means without using the distance measurement obtained by the first distance measuring means when the distance measurement obtained by said first distance measuring means is not within said predetermined distance range.

6. A device according to claim 2, wherein said control means forms the focal adjustment information by preferentially using the distance measurement obtained by said first distance measuring means when the distance measurement obtained by said first distance measuring means is within said predetermined distance range and an adjusted focal point of a photographic optical system determined by the measurement by said first distance measuring means is separated more than a predetermined value from an adjusted focal point of the optical system determined by the measurement by said second distance measuring means.

7. A device according to claim 2, whererin said control means forms the focal adjustment information by preferentially using the distance measurement obtained by said first distance measuring means when the measurement obtained by said first distance measuring means is within the predetermined distance range and the distance measurement obtained by the first distance measuring obtained by said second distance measuring means are not in a range coverable by a field depth.

8. A device for forming a focal adjustment information for a camera, comprising:
(A) first distance measuring means for measuring a distance of a first range of a scene to be photographed;
(B) second distance measuring means for measuring a distance of a second range of the scene, and;
(C) control means for forming a focal adjustment information by preferentially using the distance measurement obtained by said first distance measuring means in case when said distance measurement by the first distance measuring means is within a predetermined distance range.

9. A device according to claim 8, wherein said control means forms the focal adjustment information by preferentially using the distance measurement obtained by said second distance measuring means when the distance measurement obtained by said first distance measuring means is not within said predetermined distance range.

10. A device according to claim 8, wherein said control means forms the focal adjustment information by using the distance measurement obtained by said first distance measuring means without using the distance measurement obtained by the second distance measuring means when the distance measurement obtained by said first distance measuring means is within said predetermined distance range.

11. A device according to claim 8, wherein said control means forms the focal adjustment information on the basis of the distance measurement obtained by said second distance measuring means without using the distance measurement obtained by the first distance measuring means when the distance measurement obtained by said first distance measuring means is not within said predetermined distance range.

12. A device for forming a focal adjustment information for a camera comprising:
(A) first distance measuring means for measuring a distance of a roughly central portion of a scene to be photographed;
(B) second distance measuring means for measuring a distance of a roughly peripheral portion of the scene or the distance of the roughly central portion and the roughly peripheral portion of the scene; and
(C) control means for forming the focal adjustment information by preferentially using the distance measurement obtained by said first distance measuring means when an adjusted focal point of a photographic optical system determined in correspondence to the distance measurement by said first distance measuring means is separated more than a predetermined value from an adjusted focal point of the photographic optical system determined in correspondence to the distance measurement by said second distance measuring means.

13. A device for forming a focal adjustment information for a camera, comprising:

(A) first distance measuring means for measuring a distance of a roughly central portion of a scene to be photographed;

(B) second distance measuring means for measuring a distance of a roughly peripheral portion of the scene or the distance of the roughly central portion and the roughly peripheral portion of the scene; and (C) control means for forming the focal adjustment information by preferentially using the distance measurement obtained by said first distance measuring means when an adjusted focal point of a photographic optical system determined in correspondence to the distance measurement by said first distance measuring means and an adjusted focal point of the photographic optical system determined in correspondence to the distance measurement of said second distance measuring means are within a predetermined value.

14. A device according to claim 13, wherein said control means forms the focal adjustment information by using the distance measurement obtained by said first distance measuring means without using the distance measurement obtained by the second distance measuring means when the adjusted focal point of the photographic optical system determined in correspondence to the distance measurement by said first distance measuring means and the adjusted focal point of the photographic optical system determined in correspondence to the distance measurement by said second distance measuring means are within said predetermined value.

15. A device for forming a focal adjustment information for a camera comprising:

(A) first distance measuring means for measuring a distance of a roughly central portion of a scene to be photographed;

(B) second distance measuring means for measuring a distance of a roughly peripheral portion of the scene or the distance of the roughly central portion and the roughly peripheral portion of the scene; and (C) control means for forming the focal adjustment information by preferentially using the distance measurement obtained by said first distance measuring means when the distance measurement by said first distance measuring means and the distance measurement by the second distance measuring means are in a range coverable by a field depth.

16. A device according to claim 15, wherein said control means forms the focal adjustment information by using the distance measurement obtained by said first distance measuring means without using the distance measurement obtained by the second distance measuring means when the distance measurement by said first distance measuring means and the distance measurement by the second distance measuring means are in said range coverable by the field depth.

* * * * *